United States Patent [19]
Friedes et al.

[11] Patent Number: 5,311,583
[45] Date of Patent: May 10, 1994

[54] INTERNATIONAL PRIORITY CALLING SYSTEM WITH CALLBACK FEATURES

[75] Inventors: Albert Friedes, East Brunswick; Diane R. Leighton; Paramdeep S. Sahni, both of Marlboro; Walter P. Zahray, Matawan, all of N.J.

[73] Assignee: AT&T Bell Laboratories, Murray Hill, N.Y.

[21] Appl. No.: 925,050

[22] Filed: Aug. 5, 1992

[51] Int. Cl.⁵ .................. H04M 1/64; H04M 3/48
[52] U.S. Cl. ............................ 379/209; 379/207; 379/201; 379/266
[58] Field of Search ............ 379/201, 209, 207, 266, 379/309, 67, 214, 221

[56] References Cited

U.S. PATENT DOCUMENTS

| | | | |
|---|---|---|---|
| 3,553,385 | 1/1971 | Morgan et al. | 379/207 |
| 4,139,739 | 2/1979 | von Meister et al. | 379/384 |
| 4,166,929 | 9/1979 | Sheinbein | 179/18 |
| 4,788,715 | 11/1988 | Lee | 379/84 |
| 4,885,780 | 12/1989 | Gopal et al. | 379/221 |
| 5,020,095 | 5/1991 | Morganstein et al. | 379/67 |
| 5,040,208 | 9/1991 | Jolissaint | 379/209 |
| 5,155,761 | 10/1992 | Hammond | 379/67 |
| 5,185,782 | 2/1993 | Srinivasan | 379/67 |

OTHER PUBLICATIONS

"AT&T Conversant Voice System", AT&T Technical Journal vol. 65, Issue 5, pp. 34-47, Sep./Oct. 1986.

Primary Examiner—James L. Dwyer
Assistant Examiner—Daniel S. Hunter
Attorney, Agent, or Firm—Ronald D. Slusky

[57] ABSTRACT

A telephone call initiated from a first network and directed to a second network at which network resources are temporarily unavailable to route and/or switch that call, is completed by a) estimating the anticipated time before these resources can become available, b) offering the caller the option of being called back, based on that estimation, c) calling back the caller when network resources are expected to become available, d) establishing a connection from the first network to the called party at the second network, and e) merging the two calls.

12 Claims, 6 Drawing Sheets

INTERNATIONAL PRIORITY CALLING SYSTEM WITH CALLBACK FEATURES

TECHNICAL FIELD

This invention relates to communications switching systems, and more particularly, to a method and system for controlling access to network resources.

BACKGROUND OF THE INVENTION

Over the last few years, unprecedented growth in international business transactions has resulted in a corresponding increase in the demand for international communications services. To satisfy that increased demand, international communications carriers have deployed and continue to deploy additional transmission facilities, such as satellite communication links and undersea fiber optic cables, to connect, for example, international gateway switches between different countries. In addition, a number of carriers have implemented in their international telecommunications transmission systems alternate routing systems as part of a comprehensive plan for disaster recovery and network overflow management. These systems allow the establishment of communication paths between two international destinations via alternate transmission facilities when point-to-point first choice-circuit routes are unavailable (not in service or busy).

In spite of these investments and technological advances, calls to certain international destinations are sometimes completed only after a substantial number of repeated call attempts. The root cause of this unfortunate situation has been traced back to the overloaded and/or outdated conditions of the telecommunications systems of these destinations. Indeed, during busy hour periods at those destinations, even repeated call attempts are too often unavailing.

As is well known, high incidences of repeated unsuccessful call attempts cause increased congestion and reduced traffic-carrying capacity in a network. Callers' frustration and inefficient use of domestic and international trunks are the ultimate results. Furthermore, for international business callers who have to conduct critical business transactions over the phone within time windows sometimes made smaller by time zone differences, predictability in the call completion process is of paramount importance. Callers from countries accustomed to near one hundred percent, first try call completion, are clamoring for at least greater convenience if not their accustomed level of service for their international calls to these destinations.

SUMMARY OF THE INVENTION

The present invention is directed to a) recognizing when network resources to, or at, a destination are temporarily unavailable to complete a call to that destination, b) offering the caller the option of being called back if it is estimated that these resources are likely to become available within a predetermined period of time, and c) thereafter, upon availability of these network resources, initiating within the network an attempted interconnection between calling and called parties.

The estimation of the time within which network resources needed to complete a call may become available is calculated using predetermined factors and variables, such as number of callers requesting access to those resources simultaneously, network management status information (cable cuts, inoperative switching and transmission systems), and historical traffic load carried at that particular hour, day, or date.

In a preferred embodiment of the invention, when an end-to-end circuit is not available for a call directed to an international destination, the call is transferred to a subsystem within the caller's domestic network which presents an announcement to the caller to offer him or her one of three options. In a first of these options, the caller is invited to wait in a queue for the next available circuit when the expected time to complete the call is below a first predetermined threshold. The second option offers the caller the choice of either having the call placed in a queue to wait for the call to be completed or being called back. This option is offered to the caller only when the expected time to complete the call is within a predetermined intermediate range, i.e., between the first predetermined threshold and a second predetermined threshold. In a third of these options, when the anticipated completion time for the call exceeds the second predetermined threshold, the caller is not given the option of holding while his or her call is placed in the queue, but rather is invited to leave a telephone number at which he or she can be called back, upon circuit availability, allocated preferably on a first-come-first-served basis.

Advantageously, the invention allows a more efficient utilization of heavily used international trunks by reducing the idle period between call termination and initiation of new calls using these trunks. For international communications carriers, the reduction in the number of unsuccessful call attempts afforded by this invention results in the avoidance of access charge costs and international settlement expenditures that those carriers would have incurred had these unsuccessful call attempts been initiated.

DETAILED DESCRIPTION

Figure 1:
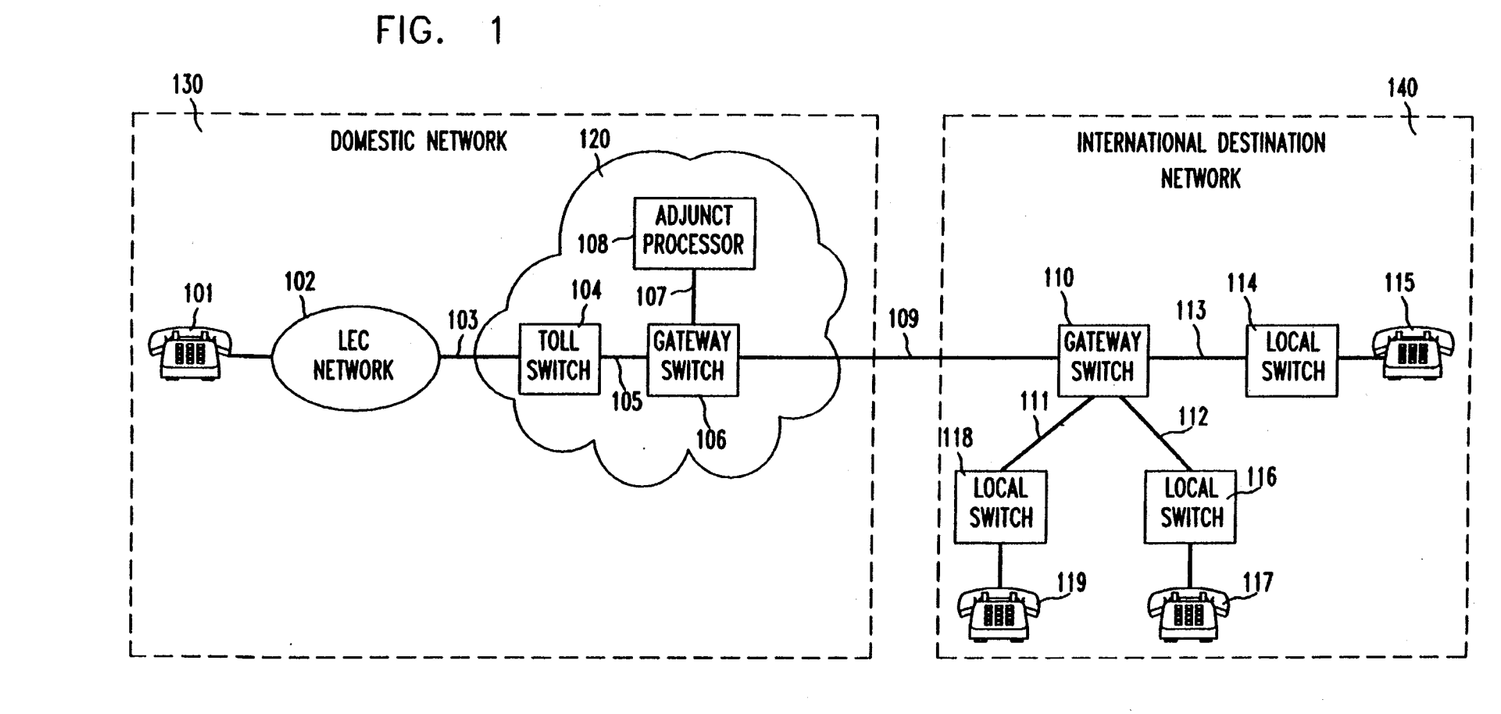
FIG. 1 is a block diagram of an international communication switching system arranged to complete international calls in accordance with our invention.

FIG. 1 is a block diagram of an international communication switching system arranged to complete international calls in accordance with our invention. The international communication switching system of FIG. 1 includes two distinct national networks, namely domestic network 130 and international destination network 140. The two national networks are connected by international trunk group 109 which may be transmission facilities, such as satellite links, fiber optic cables or copper coaxial cables. International calls are initiated from domestic network 130 comprised of Local Exchange Carrier (LEC) network 102 and international communication carrier network 120. The latter is a communication switching system arranged to route and/or complete international calls using the call processing capabilities of toll switch 104, gateway switch 106 and adjunct processor 108. International destination network 140 is comprised of gateway switch 110 and local switches 114, 116 and 118. Some international destination networks may have one or more toll switches interconnecting local switches to a gateway switch. Within domestic network 130, an exemplary station set 101 is connected to a local switch (not shown) within LEC network 102. Similarly, within international destination network 140, exemplary station sets 115, 117 and 119 are connected to local switches 114, 116 and 118, respectively.

In the system of FIG. 1, initiation of a call at station set 101 directed to a called party, for example, station set 117 within international destination network 140, results in the call being routed along with the dialed digits to LEC network 102. The latter is comprised of central office and tandem switches arranged to route and/or complete local, long distance and international calls. Upon receiving the digits dialed by the caller and determining, based on those digits, that the call is destined for a different communications network, LEC network 102 generates request connection signals and forwards these signals along with calling and called numbers to toll switch 104 via trunk group 103. The calling and called numbers information received from LEC network 102 by toll switch 104 are routed by (via trunk group 105) to gateway switch 106 for further processing when toll switch 104 determines, based on the received dialed numbers, that the call is directed to international destination 140. Some domestic networks may not have a toll switch and, accordingly, an international call may be routed from LEC network 102 to a gateway switch directly.

Gateway switches 106 and 110 are processor-controlled, software-driven switching systems which serve as points of access and egress for all traffic between domestic network 130 and international destination 140. When at least one channel is available on trunk group 109 and network resources are available at international destination network 140, the call is routed to gateway switch 110 and completed in conventional fashion, resulting in a ringing tone being applied, in this example, to station set 117 by local switch 116 which is connected to gateway switch 110 via trunk group 112. Similarly, if the call is destined for station set 115 (118), gateway switch 110 routes the call to local switch 114 (118) via trunk group 113 (111). When a call cannot be completed at international destination 140 because of unavailability of network resources to, or at, that destination, gateway switch 106 is arranged to forward the call along with the calling and called numbers to adjunct processor 108 via trunk group 107. Illustratively, trunk group 107 may be a digital multiplexed interfaced trunk group wherein signaling information, such as the calling and called numbers, is received via one logical channel while the call is received via a different logical channel.

Figure 2:
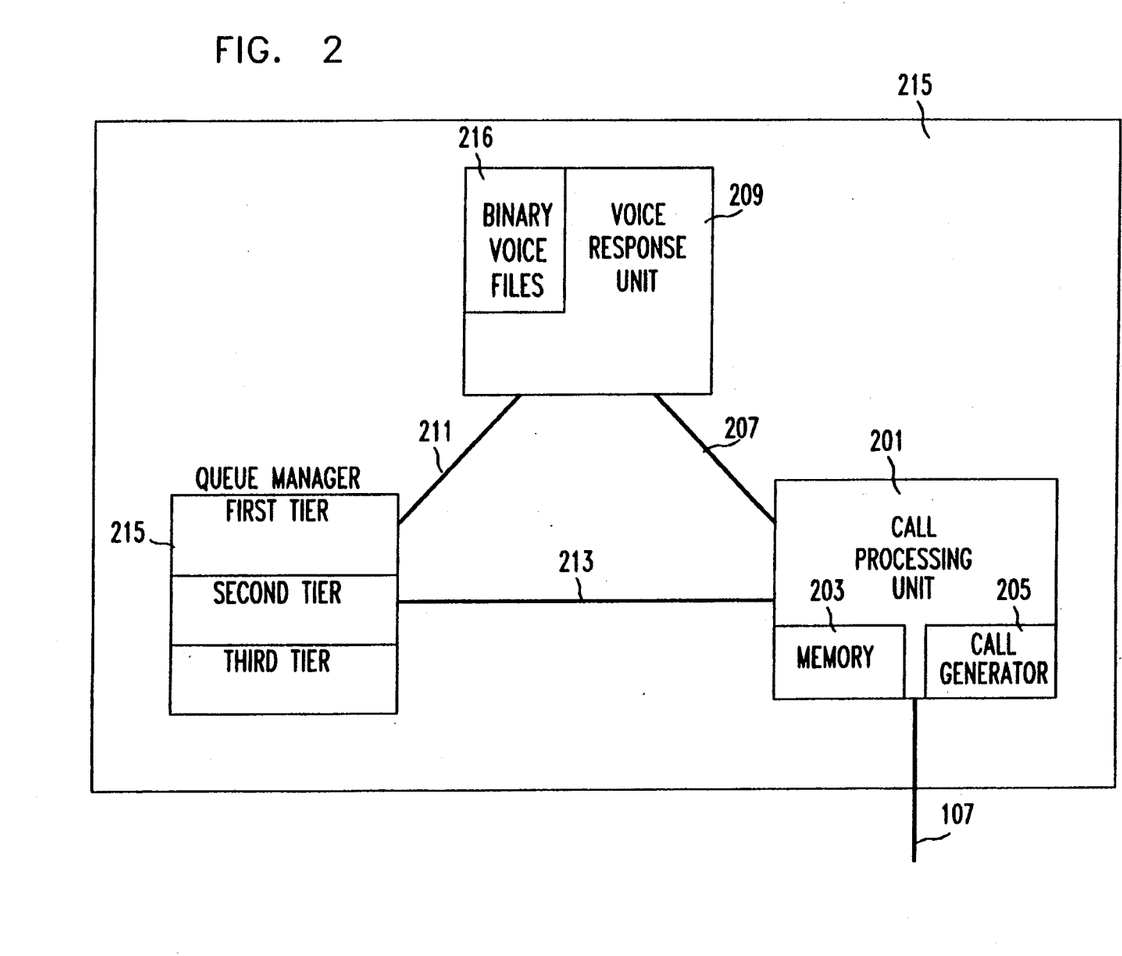
FIG. 2 is a block diagram of an adjunct processor comprised of some of the network elements needed to implement our invention.

FIG. 2 is a block diagram of adjunct processor 108 of FIG. 1. As depicted in FIG. 2, adjunct processor 108 is comprised of a) queue manager 215 which stores and manages records of calls waiting in a queue to be routed to international destination 140, b) voice response unit 209, which communicates with queue manager 215 via bus 211, and which retrieves particular records stored in binary voice files 216 to present appropriate announcements to callers, and c) call processing unit 201 which supervises the operations of, and communicates with voice response unit 209 and queue manager 215 via communication paths 207 and 213, respectively. Call processing unit 201 is a processor which executes software programs stored in memory 203 to perform a set of functions in collaboration with queue manager 215 and voice response unit 209. One of the most important functions performed by call processing unit 201 involves the estimation of the expected time for a call to be completed when network resources to, or at, destination 140 are unavailable.

When gateway switch 106 determines that a call to international destination 140 cannot be completed, it sends a specific signal to call processing unit 201, responsive to which call processing unit 201 computes the estimated time needed to complete the call. In order to perform this function, call processing unit 201 uses two kinds of information stored in memory 203. The first is an algorithm designed for the specific destination in question (in this case, international destination 140). The second kind of information is comprised of contemporaneous and historical call completion records for that destination.

In addition to the factors mentioned above, the algorithm stored in memory 203 of call processing unit 201 also uses as input other factors, such as information about the network infrastructure of that destination, the number of channels in trunk group 109 of FIG. 1, availability of alternate routing systems, calling patterns of residents of the destination, etc.

Once call processing unit 201 estimates the call completion time for a call, it sends a signal to voice response unit 209 to present a specific announcement to the caller. Among the announcements presented to callers by voice response unit 209 at various times are greetings to callers and prompting instructions to enter specific touchtone (dual tone multiple frequency) or spoken information. Voice response unit 209 is also arranged to collect the information provided by the caller. Voice response unit 209 may be implemented using the AT&T Conversant ® Voice Information system whose architecture and functionality are described in *AT&T Technical Journal*, Vol. 65, Issue 5, pp 34–47, September/October 1986.

Depending on the estimated time for the call to be completed, one of four general types of invitation announcements can be presented to the caller by voice response unit 209. When the expected time to complete the call is short, i.e. less than a first predetermined threshold, a first of these announcements invites the caller to wait for the next available circuit. That first predetermined threshold can be, by way of example, the mid-point of an holding time range deemed acceptable by human factors studies. When the expected time to complete the call is within an intermediate range i.e. between the first threshold and a second predetermined threshold, the announcement presented to the caller invites him or her to choose from the options of either being placed in a queue to wait for the call to be completed or to be called back at a telephone number of his or her choice when a circuit is expected to become available. The second predetermined threshold can be the upper bound of the aforementioned acceptable holding time range. When the expected time to complete the call is long, i.e. greater than the second predetermined threshold, the announcement only invites the caller to provide a telephone number at which he or she can be called back. Finally, when call completion time cannot be reasonably estimated which may be the case if, for example, there has been a major switching equipment or transmission facility failure, the announcement indicates to the caller that no circuit is available for destination 140.

Queue manager 215 is a processor with a storage device arranged to store, in a tiered structure, information associated with callers waiting for their calls to be completed. The first tier of information in queue manager 215 includes data related to calls for which the expected completion time is less than the first predetermined threshold. Thus, when the first tier of queue manager 215 is not full, callers are invited to hold for the next available circuit since the international leg of the call is about to be attempted. Grouped in the second tier of queue manager 215 is information for calls whose estimated call completion time falls between the first and the second predetermined threshold. Thus, when the first tier is full, but the second tier is not, callers are prompted to choose either to hold for the next available circuit or to be called back. The third tier includes information for all calls whose estimated completion time exceeds the second predetermined threshold. Accordingly, when the first and second tiers are full, callers are prompted by voice response unit 209 only to provide a telephone number at which they can be called back. The number of queued call records allowed in each of the three tiers is calculated periodically, based on a number of factors which include a) the predetermined expected call completion time thresholds which define the boundaries between the tiers b) recent exit rate from the queue, and other variables, such as network management status information mentioned above.

Figure 3:
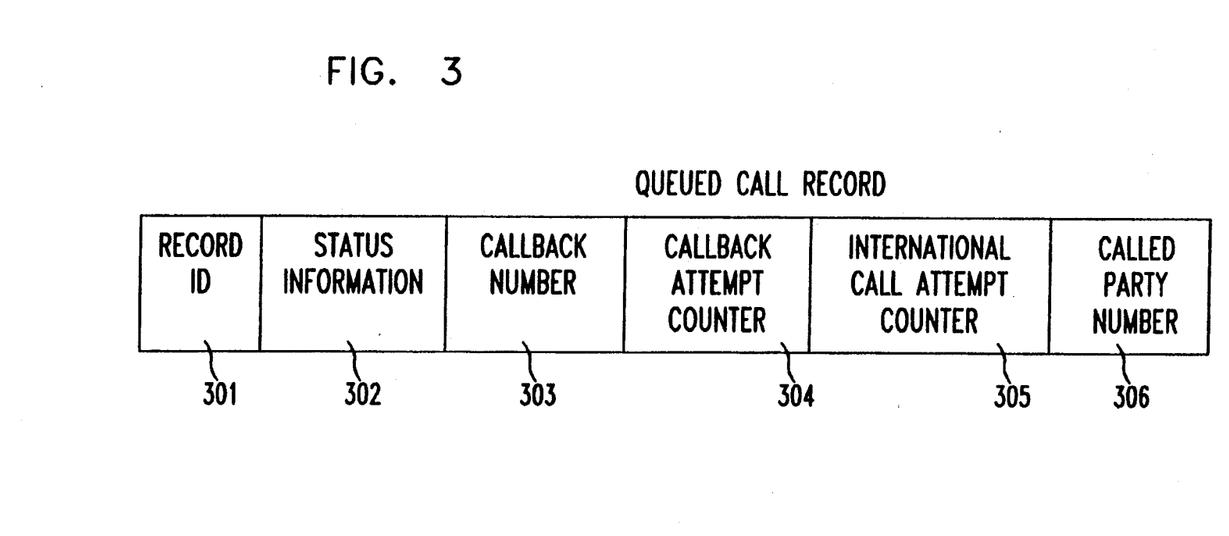
FIG. 3 shows a record created for a call before it is placed in a queue.

When a caller selects to be placed on the queue, call processing unit 201 uses information associated with the call received from gateway switch 106 of FIG. 1 to create a queued call record for the call as shown in FIG. 3. That record is then forwarded to queue manager 215 and entered at the bottom of the queue (meaning the highest tier with an empty slot). When a record for a caller waiting to be called back progresses to the head of the queue's second tier, queue manager 215 sends the callback number to call processing unit 201 which uses that number and call generator 205 to initiate a call to the caller in question.

FIG. 3 shows different fields that are illustratively included in a queued call record. When call processing unit 201 creates a record for a call, it enters into record-id field 301 an identification number in order to uniquely distinguish the newly created record from existing records. Other data captured at record-creation time and placed in the appropriate fields include a) the callback number which is provided by the caller in response to a prompt from voice response unit 209 and which is placed in callback number 303, and b) the called party number which is forwarded to call processing unit 201 of FIG. 2 by gateway switch 106 of FIG. 1 and which is placed in called party number 306.

Information for remaining fields is provided by queue manager 215 as the call enters, progresses through or is processed while it is within the queue. In particular, status information 302 is a counter that indicates the relative position of the associated call in the queue. When the call enters the queue, the status information field is loaded with a number reflecting the number of calls in the queue. Subsequently, the number in that field is decremented as the record progresses towards the head of the queue. The content of status information 302 is compared to the calculated number of queued call records allowed in each tier to determine the specific tier or the relative position within a tier for a particular record at a specific period of time. For example, if, based on the calculation, the first tier is set to contain twenty queued call records, the content of status information 302 is compared to the number twenty (20) to determine the tier in which the record is located and the relative position of the call within that tier. Alternatively, the relative position of a specific record within the queue can be established by pointers. Queue manager 215 is arranged to monitor the content of status information field for queued call records associated with callers waiting to be called back. When those records progress to the head of the second tier, queue manager 215 forwards the callback number to call processing unit 201 which uses call generator 205 to initiate a call to that number.

The queued call record also contains two other counters, namely callback attempt counter 304 and international call attempt counter 305. Callback attempt counter 304 indicates the number of unsuccessful call attempts to the callback number that was provided by the caller. The content of that field is set to zero when a record enters the queue and is incremented by one for every unsuccessful callback attempt initiated by call generator 205. Similarly, when a record is entered in the queue the content of the international call attempt counter field is set to zero to be incremented by one for every unsuccessful call attempt to destination 140 by call generator 205.

Figure 4:
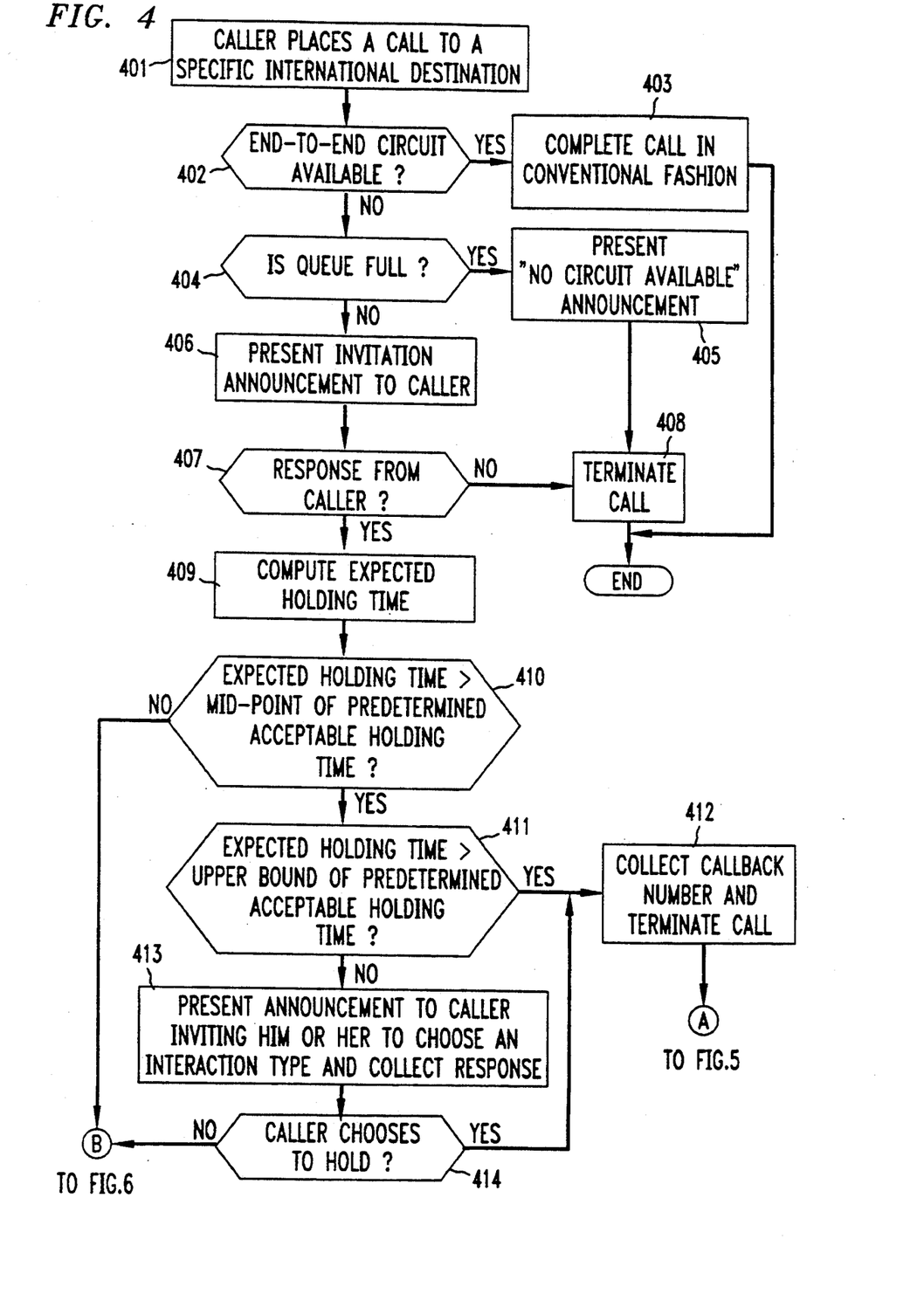
FIGS. 4 and 5 and 6 present, in flow diagram form, actions taken and decisions formulated by different elements of the international communication switching system to implement this invention.

The method contemplated by our invention is initiated in of FIG. 4 step 401, when a caller at station set 101 of FIG. 1, places a call to a called party at international destination 140. In step 402, gateway switch 106 determines whether an end-to-end circuit is available to complete the call. If a circuit is available, the call is completed in conventional fashion in step 403. If a circuit is not available, however, the call and information associated with the call (calling and called numbers) are forwarded to call processing unit 201 of FIG. 2 which determines in step 404, whether the queue is full. If the queue is full, call processing unit 201, in step 404, signals voice response unit 209 in step 405 to present an announcement to the caller indicating that no circuits are available and that the call should be retried after a predetermined amount of time. Thereafter, the call is terminated in step 408. If the queue is not full, call processing unit 201, in step 406, directs voice response unit 209 to present an announcement to the caller inviting him or her to be placed on a queue. A quick analysis of the reaction of the caller to the prompt is performed in step 407. If the caller does not respond to the prompt, the call is terminated in step 408. Upon an affirmative response of the caller to the prompt, call processing unit 201, in step 409 computes the expected holding time using the algorithm and the records stored in memory 203, as described above. In step 410 a determination is made as to whether the expected holding time is greater than the aforementioned first predetermined threshold. Upon an affirmative answer to that determination, in step 411, the expected holding time is compared to the aforementioned second predetermined threshold. If the expected holding time exceeds the second predetermined threshold, then, in step 412, voice response unit 209 prompts the caller for a callback number, collects that number and sends a signal to call processing unit 201 to terminate the call.

If the expected holding time, however, falls between the first and second predetermined thresholds i.e., the mid-point and the upper bound of the preset acceptable holding time range, in step 413 voice response unit 209 presents an announcement to the caller indicating that the latter has a choice either to have the call placed in a queue waiting for the call to be completed (holding interaction) or to be called back when a circuit becomes available (callback interaction). In step 414, an analysis is made of the caller's selection. If the caller chooses not to hold, a callback number is collected and the call is terminated, as described above for step 412. Subsequently, the callback interaction instructions of FIG. 5, described below are executed. If the caller prefers to hold or the expected holding time is less than the first predetermined threshold, the holding interaction instructions of FIG. 6 are executed.

Figure 5:
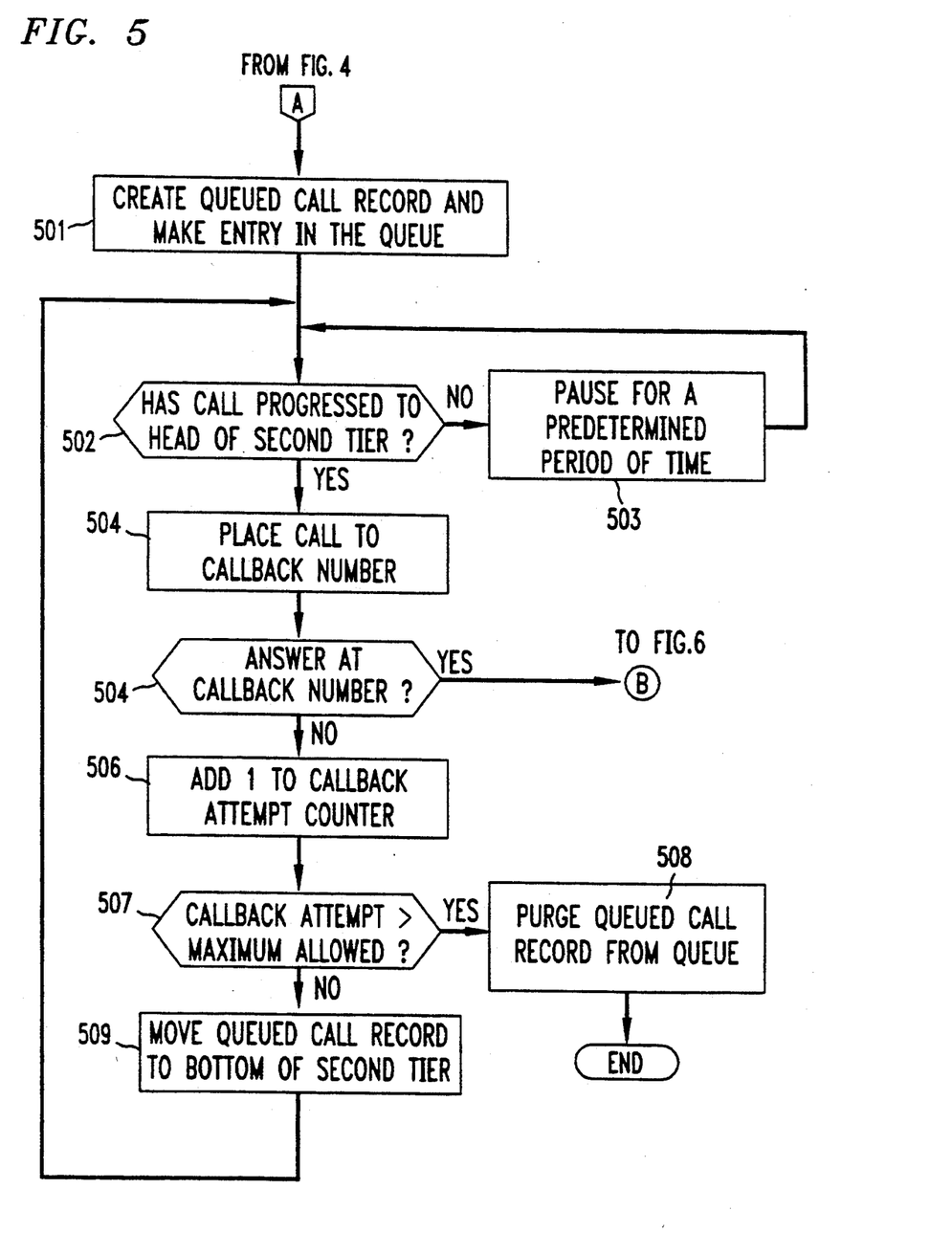

FIG. 5 describes the steps performed by adjunct processor 108 of FIG. 1 when a caller leaves a callback number at which he or she can be reached when a circuit to the international destination is about to become available. After voice response unit 209 of FIG. 2 has collected the callback number from the caller, in step 501, the collected information is returned to call processing unit 201 which uses that information to create a queued call record that is forwarded to queue manager 215 which enters that record at the bottom of the queue. Using the techniques described above, an analysis of the relative position of the record for that call is performed in step 502, to determine whether the call has progressed to the head of the queue's second tier. If the record for the call has not reached the head of the queue's second tier, after a pause for a predetermined period of time in step 503, the test described in step 502 is repeated until the record reaches the head of the queue's second tier. In step 504, queue manager 215 of FIG. 2 sends the callback number to call processing unit 201 which uses the callback number and call generator 205 to place a call to that number. An inquiry is then made as to whether an answer is received from the telephone set at the callback number. If an appropriate answer is received, the holding interaction instructions described in FIG. 6 are performed. If a busy signal is received from the callback number or a ring-no-answer condition is encountered, or the original caller who placed the international call is unavailable, in step 506 callback attempt counter 304 of FIG. 3 is incremented by one. In step 507 the content of callback attempt counter 304 is compared to a predetermined threshold of maximum allowable callback attempts to determine if the counter has exceeded that threshold. Upon a positive answer to that inquiry, in step 508 the queued call record is purged from the queue. If the threshold has not been exceeded, however, in step 509, the queued call record is moved to the bottom of the second tier and steps 502 to 507 are repeated.

Figure 6:
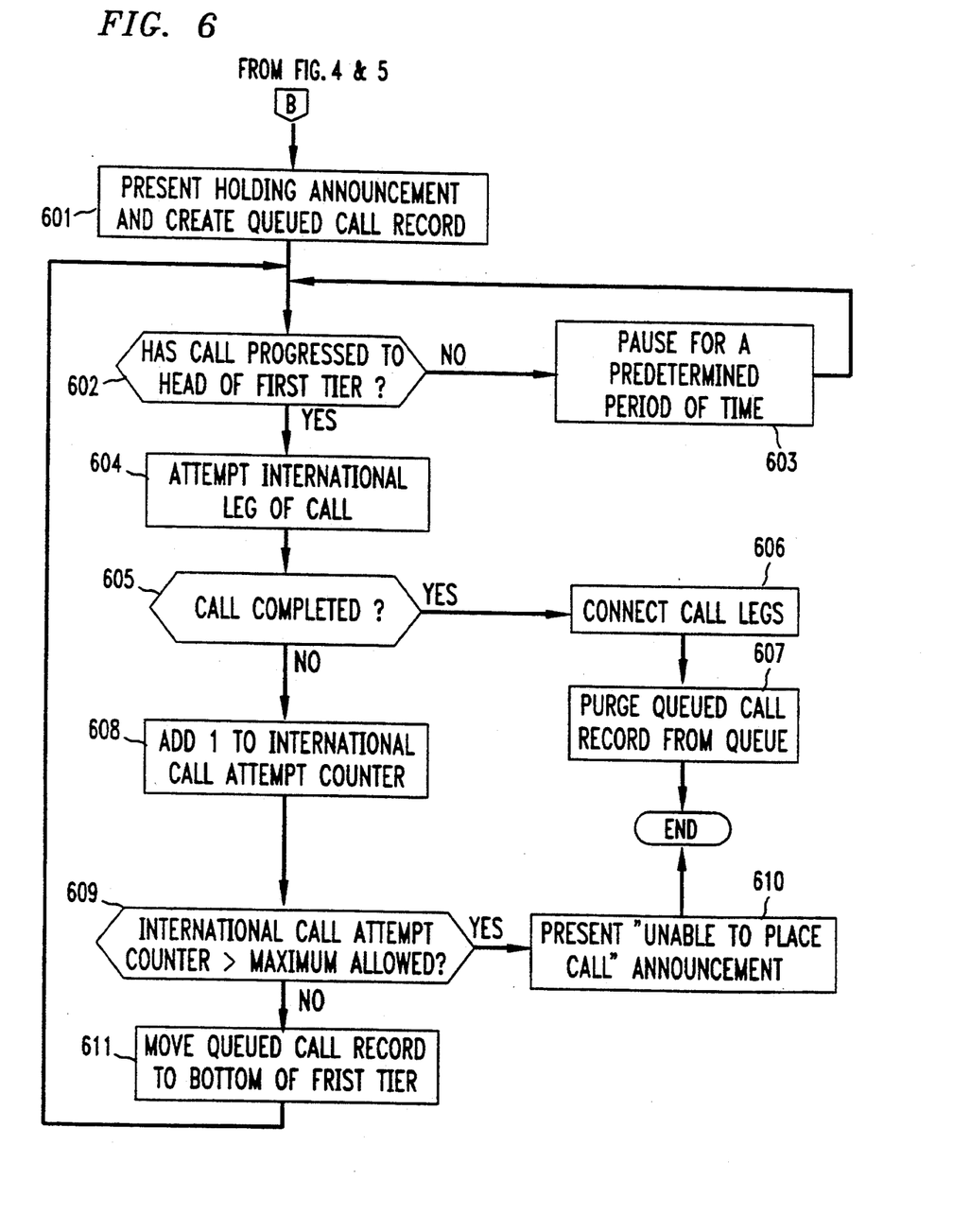

FIG. 6 describes the steps performed by adjunct processor 108 of FIG. 1 when a caller chooses to hold or the expected holding time is less than the first predetermined threshold. In step 601, voice response unit presents an announcement to the caller indicating that the call will be processed in the order received when a circuit becomes available. Information associated with the call is used by call processing unit 201 to create a queued call record for the call. That record is forwarded to queue manager 215 which enters it at the bottom of the queue. The relative position of the record is checked in step 602 to determine whether it has progressed to the head of the queue's first tier. Upon a negative answer to that inquiry, after a pause for a predetermined period of time in step 603, the inquiry of step 602 is repeated until the record reaches the head of the queue. In step 604, the called number is forwarded by queue manager 215 to call processing unit 201 which uses call generator 205 and the called number to place a call to international destination 140 when a channel is available in trunk group 109 of FIG. 1. In step 605 a determination is made as to whether the call was completed. If the call could not be completed, the content of international call attempt counter 305 is incremented by one. That counter is compared to a predetermined threshold in step 608 to determine whether the counter has exceeded the maximum allowable international call attempts for a single call. If the threshold has been exceeded, in Step 610, voice processing unit 209 presents an announcement to the caller indicating that the international communication carrier is unable to complete the call for reasons beyond its control. If the threshold has not been exceeded, however, the record is moved to the bottom of the first tier in step 611, and subsequently, steps 602 to 609 are repeated. If the international leg of the call is completed in step 606, call processing unit 201 waits for the first ring from the called party's telephone set and causes the international leg of the call to be bridged to the domestic leg established between the caller and adjunct processor 108. Subsequently, in step 607 the queued call record is purged from the queue.

The above description is to be construed as only an illustrative embodiment of this invention. Persons skilled in the art can easily conceive of alternative arrangements providing functionality similar to our invention without any deviation from the fundamental principles or the scope of this invention. For example, while this disclosure has focused on an international communication switching system comprised of two national networks, our invention can be readily applied to a telephone switching system comprised of a single national network.

We claim:

1. A method of completing an outgoing telephone call placed by a caller from an originating network and directed towards a destination connected to a remote network comprising the steps of:

recognizing unavailability of at least one of telephone network resources comprised of switching capacity and transmission facilities to complete said call at said destination, said resources being under the control of said remote network;

estimating in said originating network anticipated time range before said network resources can become available;

offering said caller an option of being called back when said resources become available, said offering being carried out only when the estimated time meets a predetermined criterion;

when said callback option is exercised by said caller, calling back said caller when said network resources are about to be available within a very short time frame; and initiating in said originating network an interconnection between said caller and said destination when said resources become available.

2. The invention of claim 1 wherein said offering step includes the further steps of:

soliciting and collecting from said caller a telephone number at which said caller can be called back; and terminating said call.

3. A method of allocating international circuits to callers placing calls to a common international destination comprising the steps of:
- determining that said circuits are temporarily unavailable to complete said calls;
- computing expected time to complete each call if it were to be placed in a queue;
- presenting announcements to said callers indicating at least one option to complete each call;
- in response to signals from ones of said callers, acting on said announcements, placing the calls initiated by said callers in said queue which is comprised of a) a callback section storing information about ones of said callers to be called back, and b) a holding section comprised of calls on hold waiting to be completed
- initiating periodic requests for access to one of said circuits at said destination;
- upon accessing one of said circuits, selecting one of said calls on hold to be routed via said circuit based on a predetermined position of said call in said queue; and
- calling back and placing on hold one of said callers in said calling back section in said queue based on a predetermined position of said information about said caller in said queue.

4. The method of claim 3, wherein said option is to place a call on hold in said queue when said expected time to complete said call is less than a first predetermined threshold.

5. The method of claim 3, wherein said option includes inviting a caller to select to either be placed on hold in said queue or to be called back when said expected time to complete a call falls between a first predetermined threshold and a second predetermined threshold.

6. The method of claim 3, wherein said option is to only invite said caller to be called back when said expected time to complete said call exceeds a second predetermined threshold.

7. A system of completing an outgoing telephone call placed by a caller from an originating network and directed towards a destination connected to a remote network comprising:
- means for recognizing unavailability of at least one of telephone network resources comprised of switching capacity and transmission facilities to complete said call at said destination said resources being under the control of said remote network;
- means for estimating in said originating network anticipated time range before said network resources can become available;
- means for offering said caller an option of being called back when said resources become available, said offering being carried out only when the estimated time meets a predetermined criterion;
- when said callback option is exercised by said caller, means for calling back said caller when said network resources are about to be available within a very short time frame
- means for initiating in said originating network an interconnection between said caller and said destination when said resources become available.

8. The system of claim 7 wherein said offering means further includes:
- means for soliciting and collecting from said caller a telephone number at which said caller can be called back; and
- means for terminating said call.

9. A system of allocating international circuits to callers placing calls to a common international destination comprising:
- means for determining that said circuits are temporarily unavailable to complete said calls;
- means for computing expected time to complete each call if it were to be placed in a queue;
- means for presenting announcements to said callers indicating at least one option to complete each call;
- in response to signals from ones of said callers, acting on said announcements, means for placing the calls initiated by said callers in said queue which is comprised of a) a callback section storing information about ones of said callers to be called back, and b) a holding section comprised of calls on hold waiting to be completed
- means for initiating periodic requests for access to one of said circuits at said destination;
- upon accessing one of said circuits, means for selecting one of said calls on hold to be routed via said circuit based on a predetermined position of said call in said queue; and
- means for calling back and placing on hold one of said callers in said calling back section in said queue based on a predetermined position of said information about said caller in said queue.

10. The system of claim 9, wherein said option includes placing a call on hold in said queue when said expected time to complete said call is less than a first predetermined threshold.

11. The system of claim 9, wherein said option includes inviting a caller to select to either be placed on hold in said queue or to be called back when said expected time to complete a call falls between a first predetermined threshold and a second predetermined threshold.

12. The system of claim 9, wherein said option includes inviting a caller to be called back when said expected time to complete said call exceeds a second predetermined threshold.

* * * * *